US007688812B1

(12) United States Patent
Lo et al.

(10) Patent No.: US 7,688,812 B1
(45) Date of Patent: *Mar. 30, 2010

(54) ETHERNET AUTOMATIC MEDIA SELECTION LOGIC WITH PREFERRED MEDIUM SELECTOR

(75) Inventors: William Lo, Cupertino, CA (US); Yatin Acharya, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 19 days.

This patent is subject to a terminal disclaimer.

(21) Appl. No.: 12/011,532

(22) Filed: Jan. 28, 2008

Related U.S. Application Data

(63) Continuation of application No. 10/435,301, filed on May 9, 2003, now Pat. No. 7,324,507, which is a continuation-in-part of application No. 09/991,046, filed on Nov. 21, 2001, now Pat. No. 7,054,309.

(60) Provisional application No. 60/438,933, filed on Jan. 9, 2003.

(51) Int. Cl.
*H04L 12/50* (2006.01)
*H04J 3/16* (2006.01)

(52) U.S. Cl. .................. 370/360; 370/384; 370/469

(58) Field of Classification Search ......... 370/357–360, 370/384, 386, 465, 469, 252, 241; 709/209, 709/222, 228

See application file for complete search history.

(56) References Cited

U.S. PATENT DOCUMENTS

| 5,610,903 | A | 3/1997 | Crayford |
| 5,737,108 | A | 4/1998 | Bunch et al. |
| 5,922,052 | A | 7/1999 | Heaton |
| 6,072,803 | A | 6/2000 | Allmond et al. |
| 6,073,006 | A | 6/2000 | Sawyer et al. |
| 6,215,816 | B1 | 4/2001 | Gillespie et al. |
| 6,259,745 | B1 | 7/2001 | Chan |
| 6,272,173 | B1 | 8/2001 | Hatamian |
| 6,275,501 | B1 | 8/2001 | Lucas et al. |
| 6,285,659 | B1 | 9/2001 | Feuerstraeter et al. |
| 6,385,738 | B1 | 5/2002 | Lo |

(Continued)

FOREIGN PATENT DOCUMENTS

EP 0986217 A2 3/2000

OTHER PUBLICATIONS

IEEE Stadard 802.3, Local and Metropolitan Area Networks: Physical Layer Link Signaling for 10 Mb/s, and 1000 Mb/s Auto-Negotiation on Twisted Pair, 2000 Edition, pp. 698-745; and pp. 1009-1033.

(Continued)

*Primary Examiner*—Ronald Abelson

(57) ABSTRACT

A physical layer device comprises an interface that communicates with a media access control (MAC) device. A first circuit attempts to establish a first link using a first transceiver over a first medium. A second circuit attempts to establish a second link using a second transceiver over a second medium that is different than the first medium. A media selector communicates with the interface and the first and second circuits and that enables data flow from the first medium to the MAC device using the interface when the first link is established first. A preferred medium selector communicates with the media selector and is configurable in one of a plurality of medium preference states.

60 Claims, 9 Drawing Sheets

U.S. PATENT DOCUMENTS

| | | |
|---|---|---|
| 6,389,005 B1 * | 5/2002 | Cruickshank ............... 370/352 |
| 7,012,897 B1 | 3/2006 | Sowizral et al. |
| 2003/0035410 A1 | 2/2003 | Laroia et al. |
| 2003/0179709 A1 * | 9/2003 | Huff ........................... 370/248 |
| 2004/0022238 A1 | 2/2004 | Kimmitt |

OTHER PUBLICATIONS

IEEE Standard 802.3 Edition, Local and Metropolitan Area Networks: Sections 28-38, pp. 698-1033.

* cited by examiner

ETHERNET AUTOMATIC MEDIA SELECTION LOGIC WITH PREFERRED MEDIUM SELECTOR

CROSS-REFERENCE TO RELATED APPLICATIONS

This application is a Continuation of U.S. patent Ser. No. 10/435,301, filed May 9, 2003, which application claims the benefit of U.S. Provisional Application No. 60/438,933, filed on Jan. 9, 2003, and U.S. patent application Ser. No. 09/991,046, filed Nov. 21, 2001, all of which are incorporated herein by reference in their entirety.

FIELD OF THE INVENTION

The present invention relates to computer networks, and more particularly to an automatic media selector for Ethernet networks.

BACKGROUND OF THE INVENTION

Referring now to FIG. 1, a data link layer 10 of the open systems interconnection (OSI) model includes a logical link control (LLC) layer 12 and a media access control (MAC) layer 14. The LLC layer 12 addresses and exchanges data with a network layer 16. The MAC layer 14 provides an interface between the LLC layer 12 and a physical layer device 18. The MAC layer 14 frames data for transmission over the network and then passes the frame to the physical layer device 18 for transmission as a stream of bits. In other words, the MAC layer 14 frames data into distinct units or packets that are transmitted one at a time over the network.

The physical layer device 18 typically includes a physical coding sublayer (PCS) 20, a physical medium attachment (PMA) sublayer 22, and an autonegotiation sublayer 24. A medium dependent interface (MDI) 26 such as an RJ-45 connector connects the physical layer device 18 to media 28 such as twisted pair wires, optical fiber or other media. The IEEE 802.3 specification, which is hereby incorporated by reference, further defines how physical network interfaces operate with different types of media such as coaxial cable, twisted-pair cable and optical fiber.

To improve flexibility, the physical layer device 18 of some network devices has been designed to be connected to different types of media. The manufacturer and/or the user may not know the type of media that will be used at the time of manufacturing or purchase. The type of media that is used may also change over time.

For example, the physical layer device 18 is selectively connectable to copper or optical fiber. Currently, the PCS sublayer 20 of the physical layer device 18 is programmed to handle the specific type of media that will be used. For example when optical fiber is used, the operating mode of the PCS 20 is programmed to provide an optical interface. If the user later decides to use a different type of media such as copper, the operating mode of the PCS 20 is programmed to provide a copper interface. The reprogramming process increases the cost of operating the network.

The autonegotiation sublayer 24 initiates the exchange of information between two connected network devices and automatically configures the devices to take maximum advantage of their respective abilities. The autonegotiation sublayer 24 advertises the abilities of the network device, acknowledges receipt, identifies common modes of operation, and rejects the use of operational modes that are not shared or supported by both devices. When more than one common mode of operation exists between the devices, an arbitration function of the autonegotiation layer 24 identifies and selects a single mode of operation. After autonegotiation is complete, the devices establish a link and exchange data.

SUMMARY OF THE INVENTION

A network device includes a media access controller (MAC) and a physical layer device including an interface that communicates with the MAC, first and second transceivers, and a first autonegotiation circuit that attempts to establish a first link using the first transceiver over a first medium. A second autonegotiation circuit attempts to establish a second link using the second transceiver over a second medium. A media selector communicates with the interface and the first and second autonegotiation circuits and enables data flow from the first medium to the MAC using the interface when the link over the first medium is established first. A preferred medium selector communicates with the media selector and has a no preference state and at least one of first medium preference state and a second medium preference state.

In other features, when the preferred medium selector has the second medium preference state, the media selector monitors the second medium for a qualified energy detect event. When the qualified energy detect event occurs, the media selector blocks a link status of the first medium and starts a break link timer. If a link is established by the second medium before the break link timer is up, the first link over the first medium is brought down. If a link is not established by the second medium before the break link timer is up, the first link over the first medium is not brought down.

In still other features, the first medium is copper and the second medium is fiber. The qualified energy detect event occurs when the fiber is active during a plurality of consecutive windows.

In yet other features, the first medium is fiber and the second medium is copper. The qualified energy detect event occurs when the copper is active during a plurality of consecutive windows.

In still other features, the media selector powers down at least one of the second autonegotiation circuit and the second transceiver when the first link over the first medium is established first. The media selector powers up the second autonegotiation circuit and/or the second transceiver when the first link is lost. The media selector enables data flow from the second medium to the MAC using the interface when the second link over the second medium is established first. The media selector powers down at least one of the first autonegotiation circuit and the first transceiver when the second link over the second medium is established first. The media selector powers up the at least one of the first autonegotiation circuit and the first transceiver when the second link is lost.

In still other features, the interface is a physical coding sublayer (PCS) circuit. A status indicator identifies a current active link.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
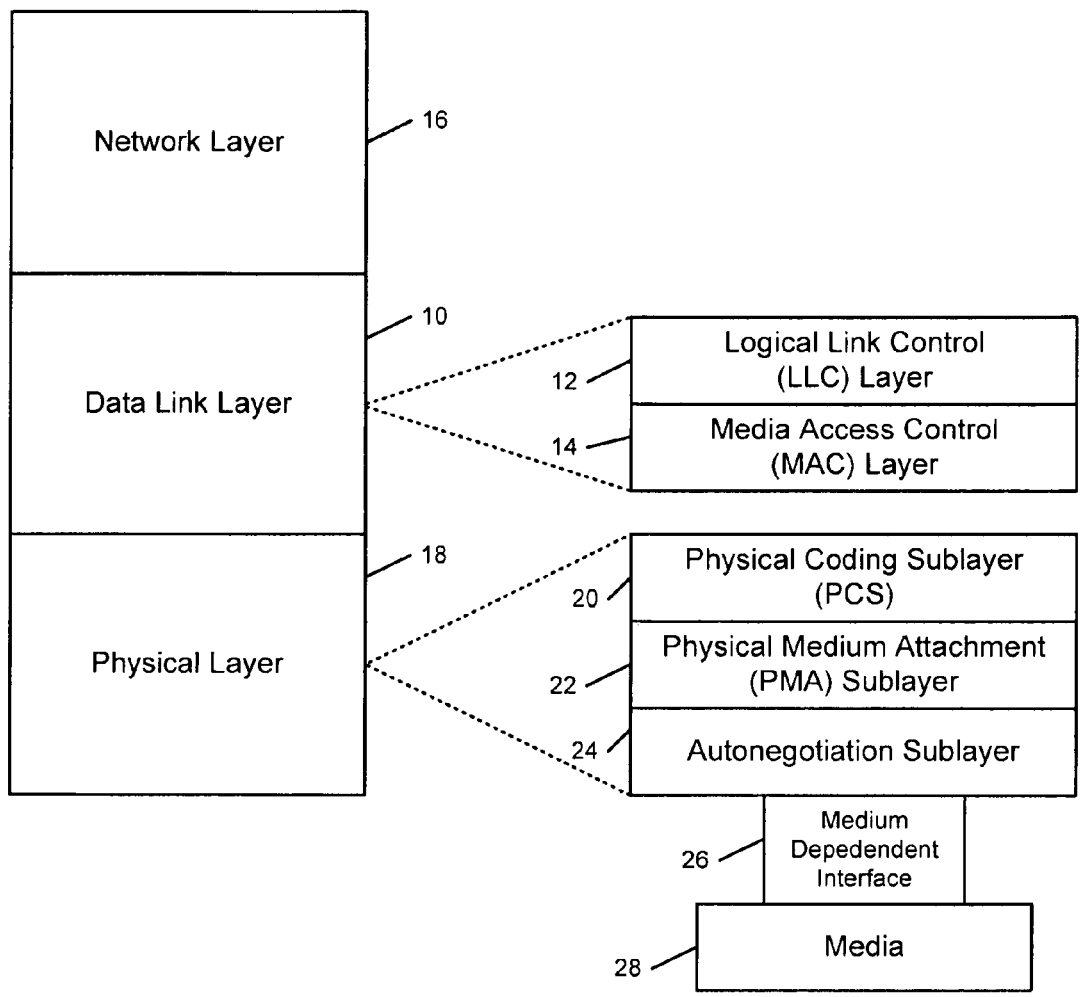
FIG. 1 is a partial OSI network model for communication between network devices according to the prior art.

The following description of the preferred embodiment(s) is merely exemplary in nature and is in no way intended to limit the invention, its application, or uses. For purposes of clarity, the same reference numbers will be used in the drawings to identify similar elements.

Figure 2:
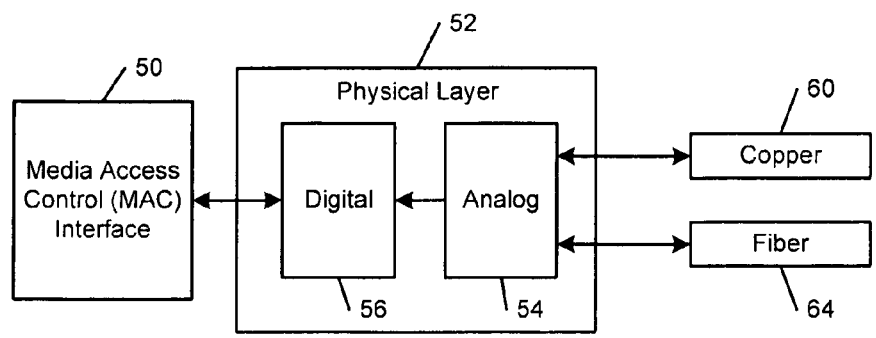
FIG. 2 is a functional block diagram of a network device including a media access control (MAC) layer and a physical layer device with an automatic media selector according to the present invention.

Referring now to FIG. 2, a media access control (MAC) layer 50 communicates with a physical layer device 52 of a network device. The physical layer device 52 includes analog and digital circuits 54 and 56. In the exemplary embodiment, the analog circuits 54 are physically connected to copper media 60 and/or fiber media 64 using media dependent interfaces (MDI) (not shown in FIG. 2) such as an RJ-45 connector or a fiber connector. Skilled artisans can appreciate that the present invention applies to other types of media such as radio frequency as well.

In use, the digital circuits 56 of the physical layer device 52 include a physical coding sublayer (PCS) interface. Both the copper and fiber autonegotiation sublayers attempt to initiate a link over the copper and fiber media 60 and 64, respectively. If autonegotiation is completed over the fiber media, the PCS interface is configured for fiber. The copper autonegotiation sublayer and the copper transceiver are preferably powered down. Data flow from the fiber media 64 to the MAC layer 50 is enabled. When the link over the fiber media 64 goes down, the copper autonegotiation layer and/or the copper transceiver are powered back up.

Alternately, if autonegotiation and a link are completed over the copper media before or at the same time as the fiber media, the PCS interface is configured for copper. The fiber autonegotiation sublayer and the fiber transceiver are preferably powered down. Data flow from the copper media 60 to the MAC layer 50 is enabled. When the link over the copper media 60 goes down, the fiber autonegotiation sublayer and the fiber transceiver are powered up. As a result, the physical layer device 52 automatically configures itself without requiring the physical layer device 52 (and/or the PCS thereof) to be reprogrammed.

Skilled artisans can appreciate that a standard interface may be provided between the MAC layer 50 and the physical layer device 52. For example, the standard interface can be TBI, GMII, SGMI, RGMII, RTBI, MII, RMII, SMII or other suitable interfaces.

Figure 3:
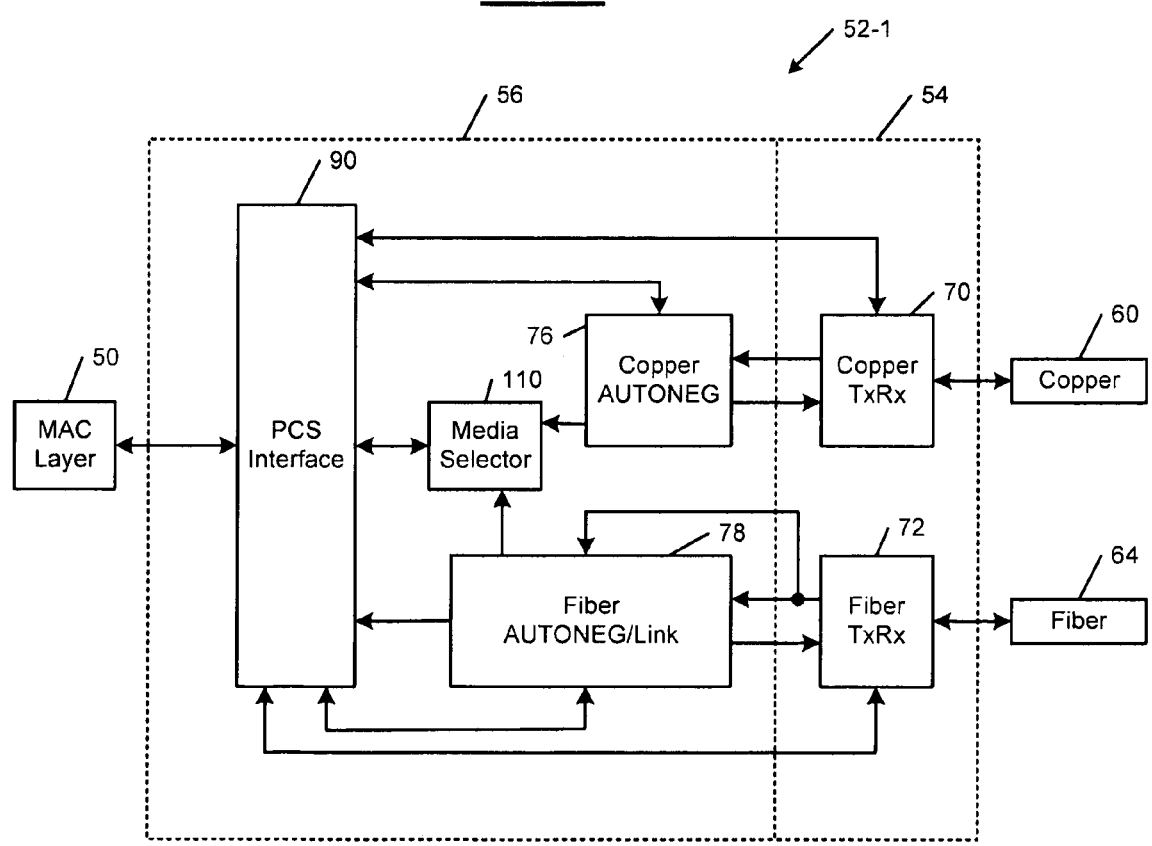
FIG. 3 is a more detailed functional block diagram of a first exemplary physical layer device including the automatic media selector of FIG. 2.

Referring now to FIG. 3, the analog circuits 54 of a first exemplary physical layer device 52-1 are shown in further detail and include a copper transceiver 70 and a fiber transceiver 72. The digital circuits 56 of the physical layer device 52-1 are also shown in further detail and include a copper autonegotiation circuit 76 and a fiber autonegotiation/link circuit 78 that are connected to the copper transceiver 70 and fiber transceiver 72, respectively. A physical coding sublayer (PCS) interface 90 communicates with the copper transceiver 70, the copper autonegotiation circuit 76, the fiber autonegotiation/link circuit 78 and/or the fiber transceiver 72. The PCS interface 90 has first and second modes of operation for copper and optical fiber, respectively, that can be selected by an automatic media selector 110 as will be described more fully below.

During copper autonegotiation, the copper transceiver 70 transmits Fast Link Pulse (FLP) bursts over the copper 60. The FLP pulse bursts contain configuration parameters that the first network device wishes to advertise. If the copper transceiver 70 receives FLP bursts, negotiation of the configuration parameters occurs and a link over the copper 60 is established and data is exchanged.

During fiber autonegotiation, code groups are initially transmitted by the fiber transceiver 72. For example code groups such as KDKD . . . are transmitted where each symbol represents multiple bits. When autonegotiation occurs, code groups such as KDCCKDCC . . . are transmitted. The fiber autonegotiation/link circuit 78 monitors the code groups and identifies sync status. When autonegotiation completes, a link over fiber 64 is established and data is exchanged.

The media selector 110 communicates with the copper autonegotiation circuit 76, the fiber autonegotiation/link circuit 78, and/or the PCS interface 90. The media selector 110 monitors the status of the copper autonegotiation circuit 76 and the fiber autonegotiation/link circuit 78 to identify the media that establishes a link first. Once the link is established over one media, the autonegotiation circuit and/or the transceiver associated with the other media are powered down until the link goes down. When this occurs, the autonegotiation circuit and/or the transceiver that is associated with the other media is powered back up.

Figure 4:
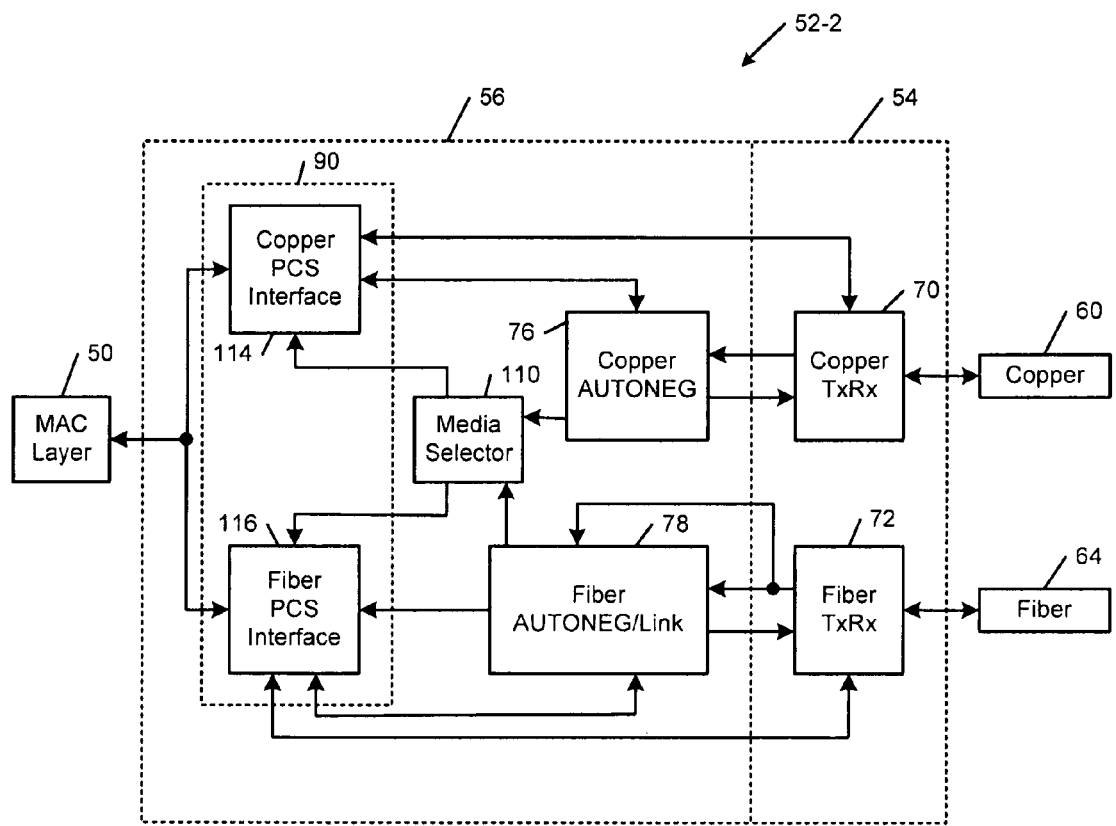
FIG. 4 is a more detailed functional block diagram of a second exemplary physical layer device including the automatic media selector of FIG. 2.

Referring now to FIG. 4, reference numbers from FIG. 3 are used in FIG. 4 where appropriate to identify the same elements. A second exemplary physical layer device 52-2 is shown. The PCS interface 90 may include a copper interface 114 and an optical fiber interface 116. As described above, the automatic media selector 110 selects one of the interfaces 114 and 116 depending upon which media completes a link first. The other interface is preferably disabled and/or powered down until the link goes down. Otherwise, the operation for the physical layer device 52-2 is similar to the physical layer device 52-1.

Figure 5:
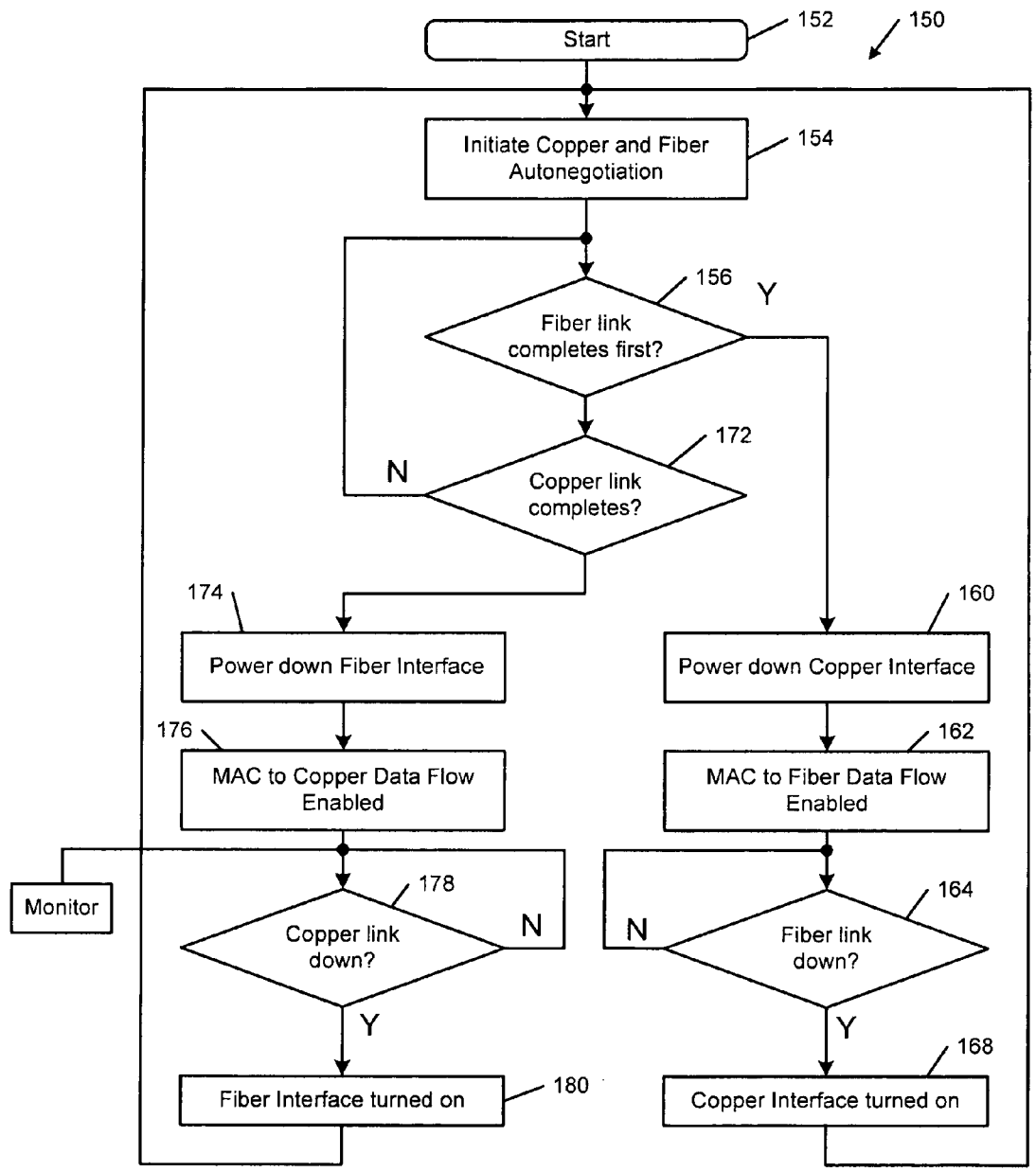
FIG. 5 illustrates steps performed by the automatic media selector of FIGS. 3 and 4.

Referring now to FIG. 5, steps for performing automatic media selection according to the present invention are shown generally at 150. Control begins with step 152 and proceeds to step 154. In step 154, both copper and fiber autonegotiation are initiated. In step 156, the media selector 110 determines whether a fiber link has completed. If the fiber link has completed, the media selector 110 powers down the copper interface 114, the copper autonegotiation circuit 76 and/or the copper transceiver 70 in step 160. In step 162, the media selector 110 enables data flow over fiber to the MAC layer 50. In step 164, the media selector 110 determines whether the fiber link is down. If not, control loops back to step 164. Otherwise, control continues with step 168 where the circuits that were powered down in step 160 are powered back up. Control continues from step 168 back to step 154.

If the fiber link does not complete first as determined in step 156, control continues with step 172. In step 172, control determines whether a copper link is established. If the copper link occurs, the media selector 110 powers down the fiber PCS interface 116, the fiber autonegotiation/link circuit 78 and/or the fiber transceiver 72 in step 174. In step 176, the media selector 110 enables data flow over copper to the MAC layer 50. In step 178, the media selector 110 determines whether the copper link is down. If not, control loops back to step 178. Otherwise, control continues with step 180 where the circuits that were powered down in step 174 are powered back up. Control continues from step 180 to step 154.

The copper interface is employed as a default when both copper and fiber complete the link at the same time. Alternatively, skilled artisans can appreciate that fiber can be selected as a default when both copper and fiber complete the link at the same time. However, both copper and fiber will rarely complete the link at the same time. As can be appreciated, the physical layer device can be implemented in a variety of ways such as analog and/or digital circuits, software executed by a processor and memory, application specific integrated circuits, or in any other suitable manner.

Figure 6:
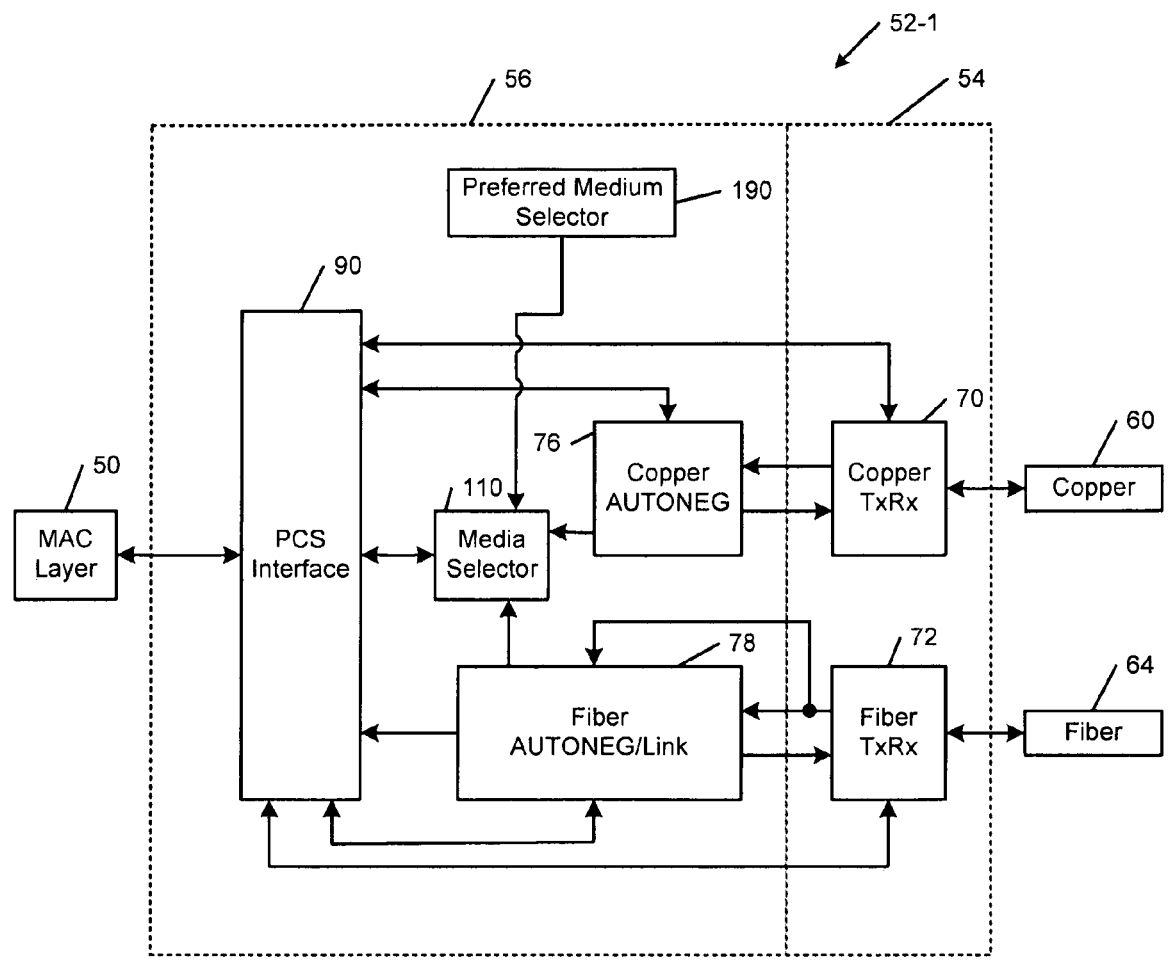
FIG. 6 is a more detailed functional block diagram of a third exemplary physical layer device including the automatic media selector and a preferred medium selector.
Figure 7:
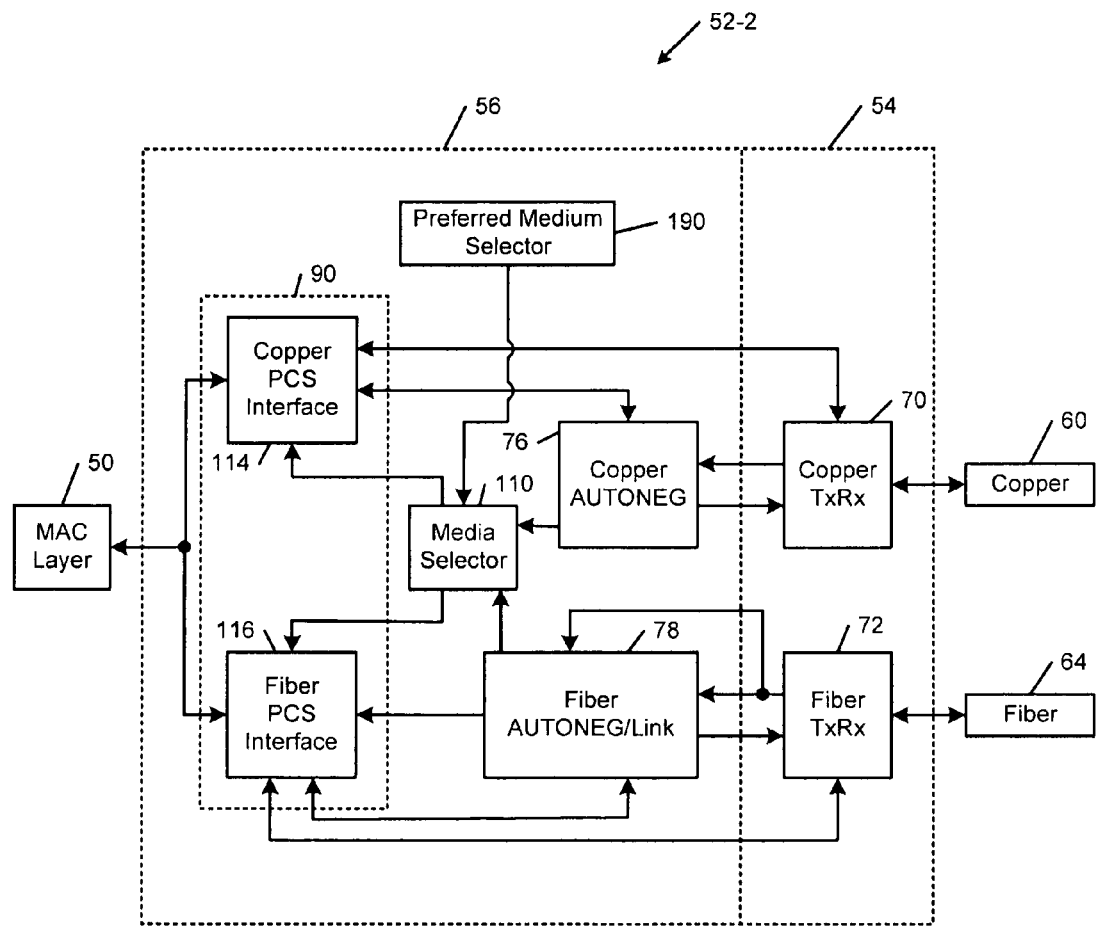
FIG. 7 is a more detailed functional block diagram of a fourth exemplary physical layer device including the automatic media selector and a preferred medium selector.

Referring now to FIGS. 6 and 7, a preferred medium selector 190 is added to the devices in FIGS. 3 and 4. The preferred medium selector 190 allows a user to select a preferred medium, such as copper or fiber or an unlinked medium, or to not select a preferred medium. If a preferred medium is not selected, the devices in FIGS. 6 and 7 operate the same as those shown in FIGS. 3 and 4 and described above. If a preferred medium is selected and a link is established on the non-preferred medium first, the devices in FIGS. 6 and 7 monitor for a qualified energy detect event on the preferred medium. If a qualified energy detect event occurs, the non-preferred link status is blocked for a predetermined period to allow the preferred medium an opportunity to establish a link. Additional details are set forth below.

Figure 8:
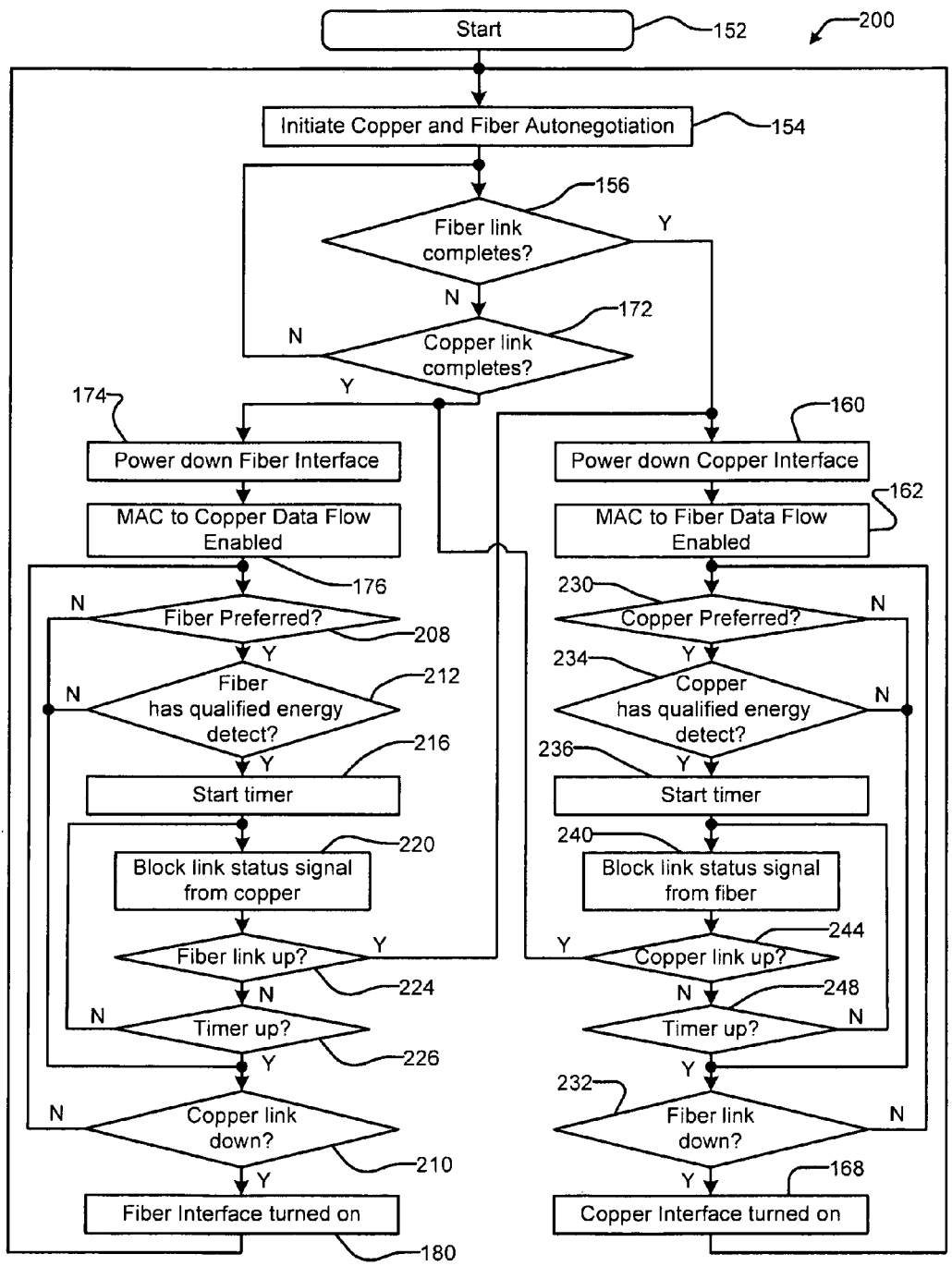
FIG. 8 illustrates steps performed by the alternate automatic media selectors of FIGS. 6 and 7 with the preferred medium selector according to the present invention.

Referring now to FIG. 8, steps performed by an alternate automatic media selector of FIGS. 6 and 7 with a preferred medium selector 190 according to the present invention are shown generally at 200. The automatic media selector with the preferred medium selector 190 allows a user to select fiber or copper as a preferred media, no preferred medium (in which case control will proceed as shown in FIG. 5) or an optional unlinked medium state (which will be described below).

For purposes of clarity, the steps in FIG. 8 that are the same as those depicted in FIG. 5 are labeled with the same reference numbers. When the copper link is completed first, control continues from step 176 to step 208 where control determines whether fiber is the preferred medium. If fiber is not the preferred medium, control continues with step 210 where control determines whether the copper link is down. If the copper link is not down, control continues with step 208. If the copper link is down in step 210, control continues with step 180 as described above.

If fiber is preferred in step 208, control determines whether there is a qualified fiber energy detect event in step 212 as will be described below in conjunction with FIG. 10. If not, control continues with step 210. If there is a qualified energy detect event as determined in step 212, control starts a break link timer in step 216. For example, the break link timer can be set equal to 4 seconds, although longer or shorter periods may be used. In step 220, control blocks a link status signal from the copper medium. In step 224, control determines whether the fiber link is up. If true, control continues with step 160. If false, control determines whether the break link timer is up in step 226. If false, control continues with step 220. Otherwise, control continues with step 210.

When the fiber link completes first, control continues from step 162 to step 230 where control determines whether copper is the preferred medium. If false, control continues with step 232 where control determines whether the fiber link is down. If the fiber link is not down, control continues with step 230. If the fiber link is down, control continues with step 168 as described above.

If copper is the preferred medium in step 230, control continues with step 234 and determines whether there is a qualified copper energy detect event as described below in conjunction with FIG. 9. If false, control continues with step 232. If there is a qualified copper energy detect event, control starts a break link timer in step 236. For example, the break link timer can be set to 4 seconds, although shorter or longer periods may be used. The break link timers 216 and 236 can also have different periods if desired. In step 240, control blocks a link status signal from the fiber medium. In step 244, control determines whether the copper link is up. If the copper link is up, control continues with step 174. If the copper link is not up in step 244, control determines whether the break link timer is up in step 248. If true, control continues with step 232. If the break link timer is not up in step 248, control continues with step 240.

Before breaking an established link for the preferred medium, the present invention detects activity and then qualifies the detected activity to prevent noise from causing a switchover. On the copper side, wire activity on both pairs is monitored. Both pairs are preferably monitored and OR-ed because the link partner may be attempting to perform auto-crossover. In a preferred embodiment, copper activity is acknowledged when there is activity during a window having a predetermined duration. For example, copper activity should occur once every 24 ms. Therefore a window that is longer than 24 ms is sufficient. For example, a window having a duration of 50 ms is suitable, although other longer or shorter periods will work. To qualify the copper energy detect, a plurality of consecutive windows should have activity. For example, 20 windows having a duration of 50 ms should have activity. As can be appreciated, other window durations and numbers of windows can be required.

On the fiber side, a signal detect input of the fiber transceiver is monitored. In a preferred embodiment, fiber activity is acknowledged when there is activity during a window having a predetermined duration. For example, fiber activity should occur almost continuously. Therefore, the duration of a window is somewhat arbitrary. For example, a window having a duration of 1 µs is suitable, although longer or shorter periods will work. To qualify the fiber energy detect, a plurality of consecutive windows should have activity. For example, all of the windows during a 1 second period should have activity. As can be appreciated, other window durations and numbers of windows can be used. In addition, if the signal detect signal is not available, any other signal that relates to received fiber data can be used.

Figure 9:
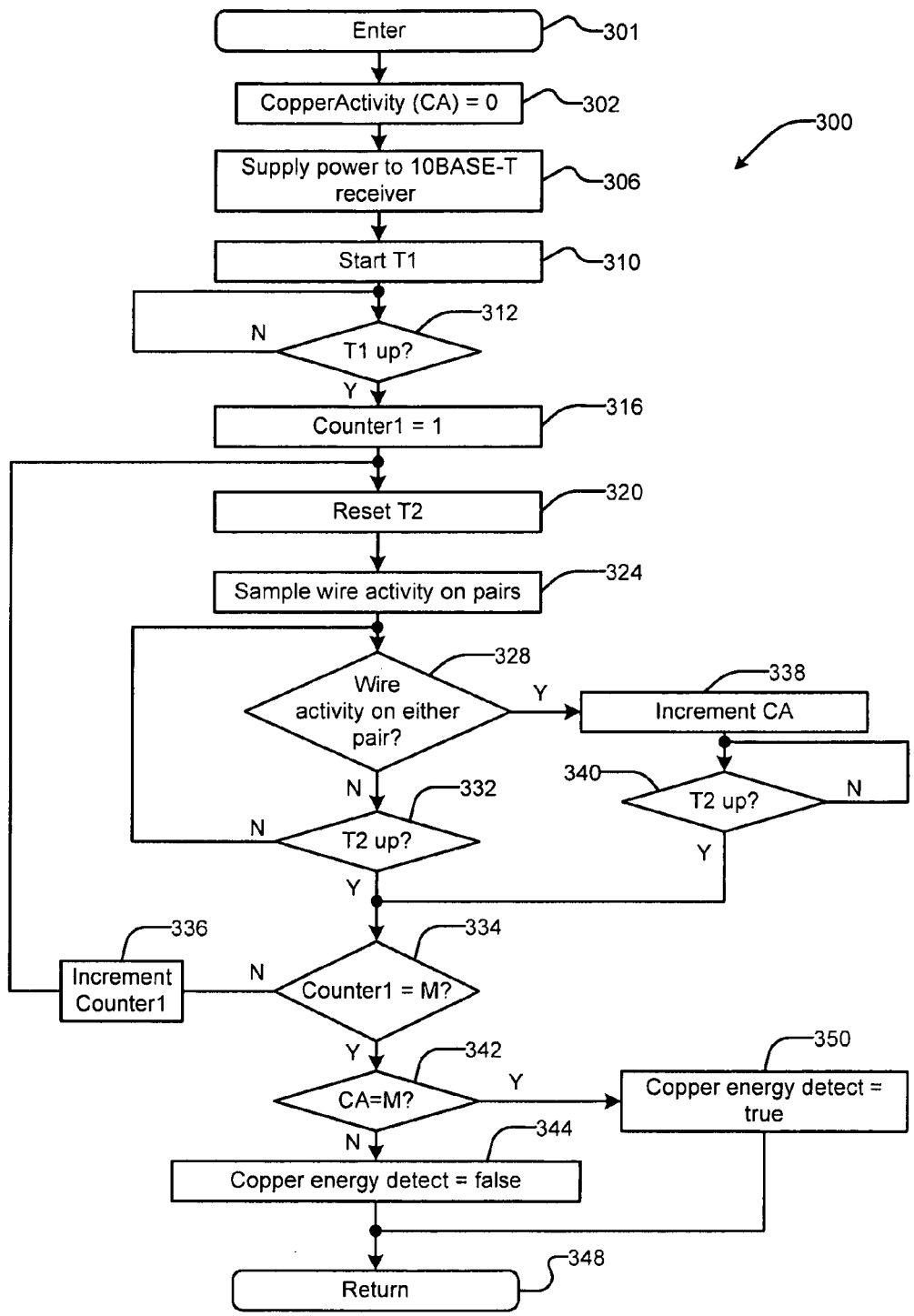
FIG. 9 illustrates steps performed by the alternate automatic media selector with the preferred medium selector to detect copper activity that is sufficient to break a fiber link when copper is preferred.

Referring now to FIG. 9, steps that are performed to detect qualified copper activity that is sufficient to break a fiber link (when copper is preferred) are shown at 300. Control enters in step 301 when step 234 in FIG. 8 is executed. In step 302, control sets copper activity (CA)=0. In step 306, control supplies power to the 10BASET receiver. Alternately, the 10BASET receiver can be powered earlier. In step 310, control starts timer T1. In step 312, control sets counter1=1. In step 320, control resets timer T2. In step 324, control samples wire activity on both of the pairs. If there is no wire activity on either pair, control continues with step 332 and determines whether T2 is up. If T2 is not up, control loops back to step 328. If T2 is up, control determines whether counter1=M in step 334. If step 334 is false, control increments counter1 in step 336 and loops back to step 320.

If there is wire activity on either pair during T2 as determined in step 328, control increments CA in step 338. In step 340, control determines whether T2 is up. If not control loops back to step 340. Otherwise control continues with step 334. If the Counter1=M in step 334 and CA< >M in step 342, control sets a copper energy detect=false in step 344 and control returns in step 348. If CA=M in step 342, control sets copper energy detect=true in step 350 and control returns in step 348.

Figure 10:
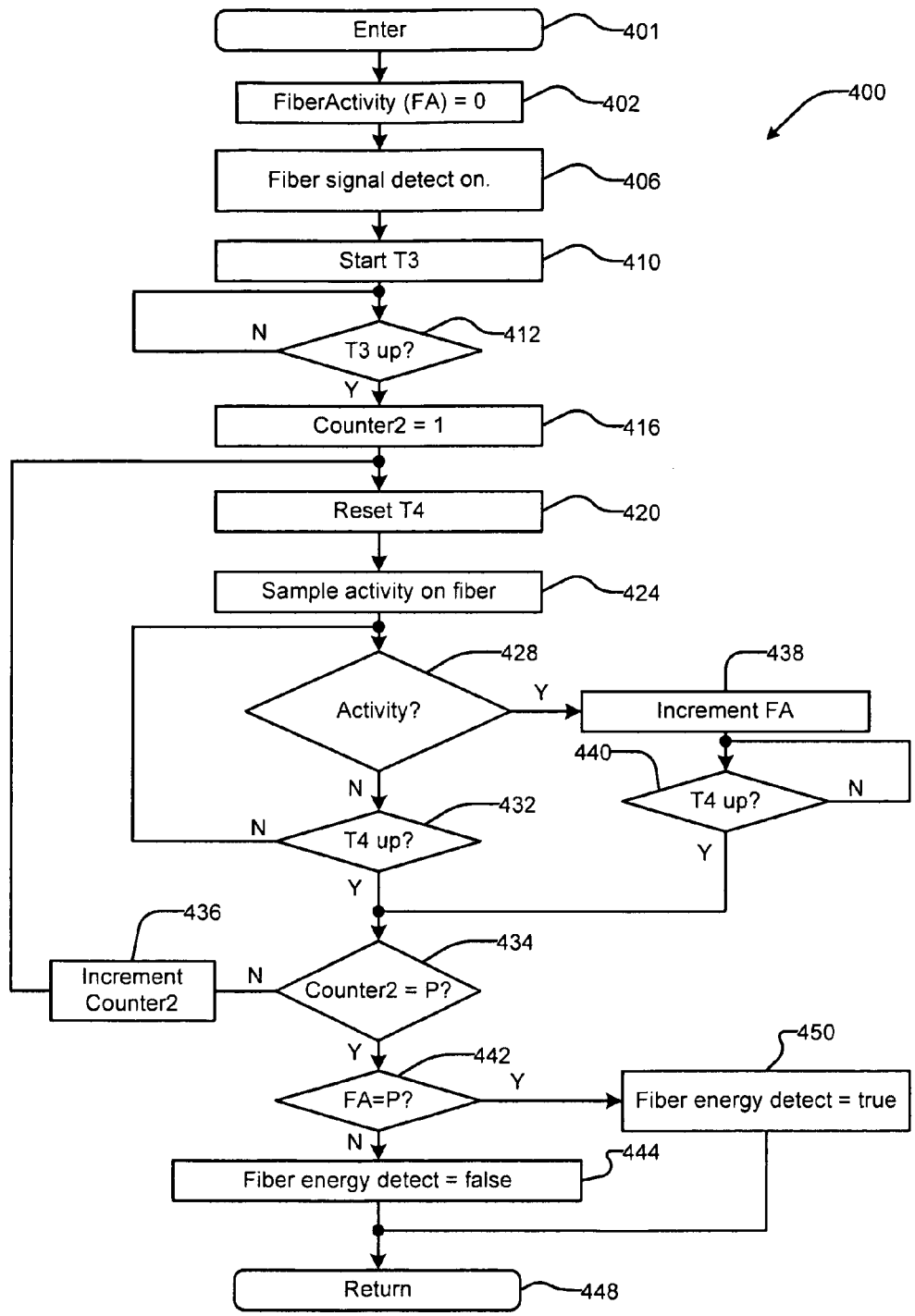
FIG. 10 illustrates steps performed by the alternate automatic media selector of FIG. 8 with the preferred medium selector to detect fiber activity that is sufficient to break a copper link when fiber is preferred.

Referring now to FIG. 10, steps that are performed to detect qualified fiber activity that is sufficient to break a copper link (when fiber is preferred) are shown at 400. Control enters in step 401 after step 212 is executed. In step 402, control sets fiber activity (FA)=0. In step 406, control turns on a fiber activity or signal detector. Alternately, the fiber activity detector can be turned on earlier. In step 410, control starts timer T3. In step 412, control determines whether T3 is up. In step 416, control sets counter2=1. In step 420, control resets timer T4. In step 424, control samples activity on the fiber. If there is no activity on the fiber, control continues with step 432 and determines whether T4 is up. If not, control loops back to step 428. If T4 is up, control determines whether counter2=P in step 434. If step 434 is false, control increments a Counter2 in step 436 and loops back to step 420.

If there is activity on the fiber during T4 as determined in step 428, control increments FA in step 438. In step 440, control determines whether T4 is up. If not control loops back to step 440. Otherwise control continues with step 434. If the Counter2=P in step 434 and FA< >P in step 442, control sets a fiber energy detect=false in step 444 and control returns in step 448. If FA=P in step 442, control sets fiber energy detect=true in step 450 and control returns in step 448.

While FIGS. 9 and 10 show one suitable way for counting and/or measuring whether qualified fiber and copper activity is present on the non-preferred medium, skilled artisans will appreciate that there are additional ways to detect whether activity is present and/or qualified. These other algorithms in FIG. 3 should have the ability to detect activity and be able to differentiate the activity from noise as opposed to other desired activity.

In addition, the preferred medium selector 190 may have an alternate mode of operation. The preferred medium selector 190 optionally allows the selection of the unlinked medium as the preferred medium. When activity is sensed on the unlinked medium, the chip initiates the steps that are set forth above. For example, the preferred medium selector is set to the unlinked medium. In this example, the link over the copper medium is established. While the copper link is active, the fiber medium, which is the unlinked medium, has activity. The preferred medium selector acts as if the fiber medium is the preferred medium and follows the steps set forth above.

Continuing with the same example, some time later, neither medium has an established link. Later, a link over the fiber medium is established. While the fiber link is active, the copper medium, which is the unlinked medium, has activity. The preferred medium selector acts as if the copper medium is the preferred medium and follows the steps set forth above. In FIG. 9, step 208 can be modified to determine whether fiber is preferred or whether the unlinked medium is preferred. Likewise step 230 can be modified to determine whether copper is preferred or whether the unlinked medium is preferred.

Thus it will be appreciated from the above, the present invention discloses an automatic media selector, a method for selecting the media, and a method for selecting a preferred medium for Ethernet transceivers. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A physical layer device, comprising:
an interface that communicates with a media access control (MAC) device;
first and second transceivers;
a first circuit that attempts to establish a first link using said first transceiver over a first medium;
a second circuit that attempts to establish a second link using said second transceiver over a second medium that is different than said first medium;
a media selector that communicates with said interface and said first and second circuits and that enables data flow from said first medium to the MAC device using said interface when said first link is established first; and
a preferred medium selector that communicates with said media selector and that is configurable in one of a plurality of medium preference states.

2. The physical layer device of claim 1 wherein when said preferred medium selector is in a first one of said plurality of medium preference states, said media selector monitors said second medium for a qualified energy detect event.

3. The physical layer device of claim 2 wherein when said qualified energy detect event occurs, said media selector blocks a link status of said first medium.

4. The physical layer device of claim 3 wherein when said qualified energy detect event occurs, said media selector starts a break link timer.

5. The physical layer device of claim 4 wherein if the second link is established by said second medium before said break link timer is up, said first link is brought down.

6. The physical layer device of claim 4 wherein if the second link is not established by said second medium before said break link timer is up, said first link is maintained.

7. The physical layer device of claim 2 wherein said first medium is copper and said second medium is fiber, and wherein said qualified energy detect event occurs when said fiber is active during a plurality of consecutive windows.

8. The physical layer device of claim 2 wherein said first medium is fiber and said second medium is copper, and wherein said qualified energy detect event occurs when said copper is active during a plurality of consecutive windows.

9. The physical layer device of claim 1 wherein said media selector powers down at least one of said second circuit and said second transceiver when said first link is established first.

10. The physical layer device of claim 9 wherein said media selector powers up said at least one of said second circuit and said second transceiver when said first link is lost.

11. The physical layer device of claim 1 wherein said media selector enables data flow from said second medium to the MAC device using said interface when said second link over said second medium is established first.

12. The physical layer device of claim 11 wherein said media selector powers down at least one of said first circuit and said first transceiver when said second link over said second medium is established first.

13. The physical layer device of claim 12 wherein said media selector powers up said at least one of said first circuit and said first transceiver when said second link is lost.

14. The physical layer device of claim 1 wherein said interface includes a physical coding sublayer (PCS) circuit.

15. The physical layer device of claim 1 further comprising a status indicator that identifies a current active link.

16. The physical layer device of claim 1 wherein when said preferred medium selector is in a second one of said plurality of medium preference states, said media selector monitors an unlinked medium for a qualified energy detect event.

17. The physical layer device of claim 16 wherein when said qualified energy detect event occurs, said media selector blocks a link status of said first medium.

18. The physical layer device of claim 16 wherein when said qualified energy detect event occurs, said media selector starts a break link timer.

19. The physical layer device of claim 18 wherein if a link is established by said previously unlinked medium before said break link timer is up, said first link is brought down.

20. The physical layer device of claim 18 wherein if a link is not established by said unlinked medium before said break link timer is up, said first link is maintained.

21. A method comprising:
  providing an interface that communicates with a media access control (MAC) device;
  attempting to establish a first link using a first transceiver over a first medium;
  attempting to establish a second link using a second transceiver over a second medium that is different than said first medium;
  enabling data flow from said first medium to the MAC device using said interface when said first link is established first; and
  selecting one of a plurality of medium preference states.

22. The method of claim 21 further comprising monitoring said second medium for a qualified energy detect event when a first one of said plurality of medium preference states is selected.

23. The method of claim 22 further comprising blocking a link status of said first medium when said qualified energy detect event occurs.

24. The method of claim 23 further comprising starting a break link timer when said qualified energy detect event occurs.

25. The method of claim 24 further comprising bringing said first link down when the second link is established by said second medium before said break link timer is up.

26. The method of claim 24 further comprising maintaining said first link when the second link is not established by said second medium before said break link timer is up.

27. The method of claim 22 wherein said first medium is copper and said second medium is fiber, and wherein said qualified energy detect event occurs when said fiber is active during a plurality of consecutive windows.

28. The method of claim 22 wherein said first medium is fiber and said second medium is copper, and wherein said qualified energy detect event occurs when said copper is active during a plurality of consecutive windows.

29. The method of claim 21 further comprising powering down said second transceiver when said first link is established first.

30. The method of claim 29 further comprising powering up said second transceiver when said first link is lost.

31. The method of claim 21 further comprising enabling data flow from said second medium to the MAC device using said interface when said second link over said second medium is established first.

32. The method of claim 31 further comprising powering down said first transceiver when said second link over said second medium is established first.

33. The method of claim 32 further comprising powering up said said first transceiver when said second link is lost.

34. The method of claim 21 wherein said interface includes a physical coding sublayer (PCS) circuit.

35. The method of claim 21 further comprising a status indicator that identifies a current active link.

36. The method of claim 21 further comprising monitoring an unlinked medium for a qualified energy detect event when in a second one of said plurality of medium preference states.

37. The method of claim 36 further comprising blocking a link status of said first medium when said qualified energy detect event occurs.

38. The method of claim 36 further comprising starting a break link timer when said qualified energy detect event occurs.

39. The method of claim 38 further comprising bringing said first link down when a link is established by said previously unlinked medium before said break link timer is up.

40. The method of claim 38 further comprising maintaining said first link when a link is not established by said unlinked medium before said break link timer is up.

41. A physical layer device, comprising:
  an interface that communicates with a media access control (MAC) device;
  first and second transceivers;
  a first circuit that attempts to establish a first link using said first transceiver over a first medium;
  a second circuit that attempts to establish a second link using said second transceiver over a second medium that is different than said first medium; and
  a media selector that communicates with said interface and said first and second circuits and that enables data flow from said first medium to the MAC device using said interface when said first link is established first, and that monitors said second medium for a qualified energy detect event during said first link.

42. The physical layer device of claim 41 wherein when said qualified energy detect event occurs, said media selector blocks a link status of said first medium.

43. The physical layer device of claim 42 wherein when said qualified energy detect event occurs, said media selector starts a break link timer.

44. The physical layer device of claim 43 wherein if the second link is established by said second medium before said break link timer is up, said first link is brought down.

45. The physical layer device of claim 43 wherein if the second link is not established by said second medium before said break link timer is up, said first link is maintained.

46. The physical layer device of claim 41 wherein said first medium is copper and said second medium is fiber, and wherein said qualified energy detect event occurs when said fiber is active during a plurality of consecutive windows.

47. The physical layer device of claim 41 wherein said first medium is fiber and said second medium is copper, and wherein said qualified energy detect event occurs when said copper is active during a plurality of consecutive windows.

48. The physical layer device of claim 41 wherein said media selector powers down said second transceiver when said first link is established first and powers up said second transceiver when said first link is lost.

49. The physical layer device of claim 41 wherein said media selector enables data flow from said second medium to the MAC device using said interface when said second link over said second medium is established first, powers down said first transceiver when said second link over said second medium is established first, and powers up said first transceiver when said second link is lost.

50. The physical layer device of claim 41 wherein said interface includes a physical coding sublayer (PCS) circuit.

51. A method comprising:
providing an interface that communicates with a media access control (MAC) device;
attempting to establish a first link using a first transceiver over a first medium;
attempting to establish a second link using a second transceiver over a second medium that is different than said first medium;
enabling data flow from said first medium to the MAC device using said interface when said first link is established first; and
monitoring said second medium for a qualified energy detect event during said first link.

52. The method of claim 51 further comprising blocking a link status of said first medium when said qualified energy detect event occurs.

53. The method of claim 52 further comprising starting a break link timer when said qualified energy detect event occurs.

54. The method of claim 53 further comprising bringing down said first link when the second link is established by said second medium before said break link timer is up.

55. The method of claim 53 further comprising maintaining said first link when the second link is not established by said second medium before said break link timer is up.

56. The method of claim 51 wherein said first medium is copper and said second medium is fiber, and wherein said qualified energy detect event occurs when said fiber is active during a plurality of consecutive windows.

57. The method of claim 51 wherein said first medium is fiber and said second medium is copper, and wherein said qualified energy detect event occurs when said copper is active during a plurality of consecutive windows.

58. The method of claim 51 further comprising:
powering down said second transceiver when said first link is established first; and
powering up said at least one of said second circuit and said second transceiver when said first link is lost.

59. The method of claim 51 further comprising:
enabling data flow from said second medium to the MAC device using said interface when said second link over said second medium is established first;
powering down said first transceiver when said second link over said second medium is established first; and
powering up said first transceiver when said second link is lost.

60. The method of claim 51 wherein said interface includes a physical coding sublayer (PCS) circuit.

* * * * *